United States Patent
Wippel et al.

(10) Patent No.: US 7,641,436 B2
(45) Date of Patent: Jan. 5, 2010

(54) BALE TOTE IMPLEMENT

(76) Inventors: Patrick V. Wippel, 2276 Albern Blvd., Lancaster, PA (US) 17601; Mary E. Wippel, 2276 Albern Blvd., Lancaster, PA (US) 17601

(*) Notice: Subject to any disclaimer, the term of this patent is extended or adjusted under 35 U.S.C. 154(b) by 57 days.

(21) Appl. No.: 12/026,102

(22) Filed: Feb. 5, 2008

(65) Prior Publication Data
US 2009/0196713 A1    Aug. 6, 2009

(51) Int. Cl.
*E02F 3/96* (2006.01)
(52) U.S. Cl. .......................... 414/724; 414/722; 37/405
(58) Field of Classification Search .............. 414/722, 414/724; 37/405, 403, 444
See application file for complete search history.

(56) References Cited
U.S. PATENT DOCUMENTS

| | | | |
|---|---|---|---|
| 3,834,567 A | 9/1974 | Miller | |
| 3,908,844 A | 9/1975 | Duffield | |
| 3,921,837 A | 11/1975 | Vandewater | |
| D239,194 S | 3/1976 | Borcherding | |
| D243,326 S | 2/1977 | Vandewater | |
| 4,125,952 A * | 11/1978 | Jennings | 37/405 |
| 4,674,786 A | 6/1987 | Lynch | |
| 6,718,662 B1 * | 4/2004 | Schaff | 37/405 |
| 7,008,162 B2 | 3/2006 | Westendorf et al. | |
| 2004/0253089 A1 * | 12/2004 | Atencio | 414/724 |

OTHER PUBLICATIONS

NorthernTool.com + 1-800-0516; Paynes Forks Medium-Duty 2000-Lb. Capacity Forks; Northern Tool + Equipment; Item #103608, Clamp-on bucket forks fit any compact tractor. 42in. working area; http://www.northerntoolcom/webapp/wcs/stores/servlet/product_6970_200319497_200319497&issearch=103608.
NorthernTool.com + 1-800-221-0516; Item# 103616 Paynes Forks 48in. Debris Fork, clamps onto any tractor bucket . . . ; http://www.northerntool.com/webapp/wcs/stores/servlet/product_6970_200319503_200319503&issearch+103616.

* cited by examiner

*Primary Examiner*—Donald Underwood
(74) *Attorney, Agent, or Firm*—McNees Wallace & Nurick, LLC

(57) ABSTRACT

A bale tote implement for a skid steer vehicle including an elongated body having a plurality of openings. Each opening is configured to receive one or more fasteners and at least one of the openings is configured to receive a fastener to retain the implement in position on a bucket of the skid steer vehicle. The implement also includes a plurality of substantially hollow gathering teeth having a first end and a second end. The first end is substantially flattened and the second end includes a support dowel inserted therein. Slots are configured to receive the second end of the gathering teeth. U-shaped fasteners are positioned adjacent the second end and through at least two of the openings in the elongated body. The U-shaped fasteners apply a retention force on the second end and the support dowel to retain the teeth in position within the slots.

20 Claims, 5 Drawing Sheets

BALE TOTE IMPLEMENT

FIELD OF THE INVENTION

The present invention is directed to implements for transportation of bales. In particular, the present invention is direct to implements for transporting bales for use with skid loader or skid steer loader vehicles having a bucket or similar lift attachment.

BACKGROUND OF THE INVENTION

Small square bales, for example of hay or straw, are typically gathered by hand onto flat-bed wagons or similar vehicles for transportation to the barn or other location. In addition, even when bale thrower devices are utilized, square bales often fall from the wagon and require manual lifting and positioning on the wagon, receiving vehicle or structure. Such operations require significant manual labor wherein such operations are difficult or impossible with a single person.

What is needed is a device and method that reduces or eliminates the manual labor required for picking up square bales from the ground and loading them to a wagon or truck. Additionally needed is a device and/or method that enables loading of small square bales onto wagons or other vehicles or structures with a single person and/or in locations having terrain typically requiring manual loading.

SUMMARY OF THE INVENTION

A first aspect of the present inventions includes a bale tote implement for a skid steer vehicle including an elongated body having a plurality of openings. Each opening is configured to receive one or more fasteners and at least one of the openings is configured to receive a fastener to retain the implement in position on a bucket of the skid steer vehicle. The implement also includes a plurality of substantially hollow gathering teeth having a first end and a second end. The first end is substantially flattened and the second end includes a support dowel inserted therein. Slots are configured to receive the second end of the gathering teeth. U-shaped fasteners are positioned adjacent the second end and through at least two of the openings in the elongated body. The U-shaped fasteners apply a retention force on the second end and the support dowel to retain the teeth in position within the slots.

Another aspect of the present invention includes a method for loading bales onto a vehicle comprising providing a bale tote implement for a skid steer vehicle having an elongated body having a plurality of openings. Each opening is configured to receive one or more fasteners and at least one of the openings is configured to receive a fastener to retain the implement in position on a bucket of the skid steer vehicle. The implement also includes a plurality of substantially hollow gathering teeth having a first end and a second end. The first end is substantially flattened and the second end includes a support dowel inserted therein. Slots are configured to receive the second end of the gathering teeth. U-shaped fasteners are positioned adjacent the second end and through at least two of the openings in the elongated body. The U-shaped fasteners apply a retention force on the second end and the support dowel to retain the teeth in position within the slots. The skid steer vehicle is operated into close proximity to a square bale. The square bale is lifted onto the teeth and the teeth are directed in a direction urging the square bale toward the bucket of the skid steer vehicle. The skid steer vehicle is operated into close proximity to a receiving vehicle. The bucket is raised to a height substantially above the vehicle and the teeth are lowered to permit the bales to move onto the receiving vehicle.

One advantage of the present invention includes the ability to load bales with only one or a few people.

Another advantage is that the method of the present invention allows for the loading with few personnel in difficult or extreme terrain, such as hilly terrain.

Still another advantage is that the implement is attachable to a bucket of a skid steer vehicle by a single fastener.

Still another advantage is that the implement includes easily replaceable and/or serviceable teeth.

Still another advantage of the present disclosure is that the implement utilizes teeth that are lightweight and easily maneuverable, even in difficult terrain.

Still another advantage of the present disclosure is that the implement is sufficiently detachable and lightweight to permit shipping by normal couriers or mail systems.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention includes an implement having an attachable body for use with a skid steer vehicle allowing the simultaneous loading of at least four bales to a flat wagon receiving vehicle, truck bed receiving vehicle and/or to a storage facility. In other embodiments, particularly in remote locations having extreme and/or hilly terrain, the operator may choose to dismount and manually add additional bales up to ten or more, minimizing travel, time and fuel consumption required for loading square bales.

Figure 1:
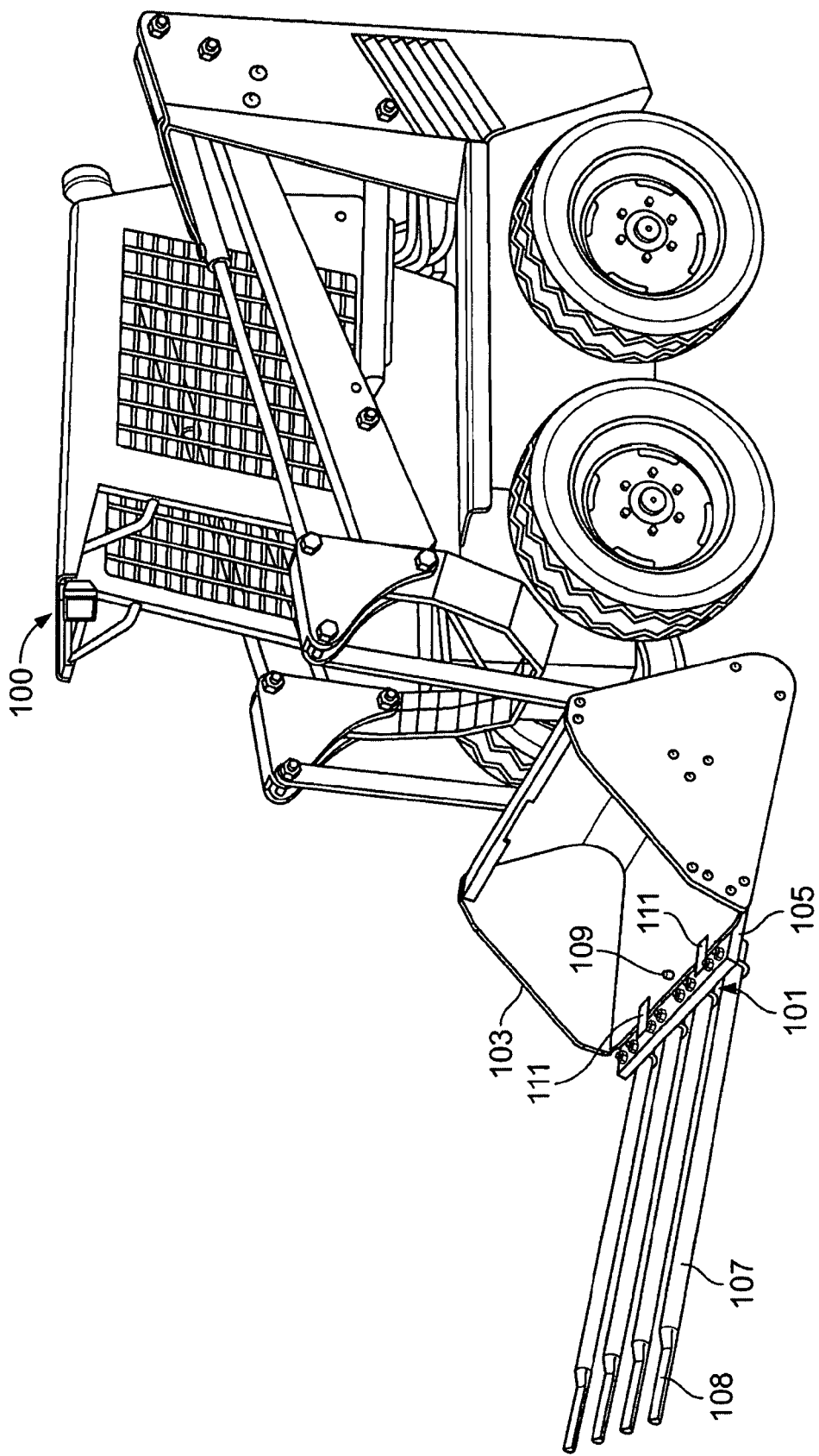
FIG. 1 is a perspective view of a skid steer vehicle having an implement according to an embodiment of the present invention.
Figure 5:
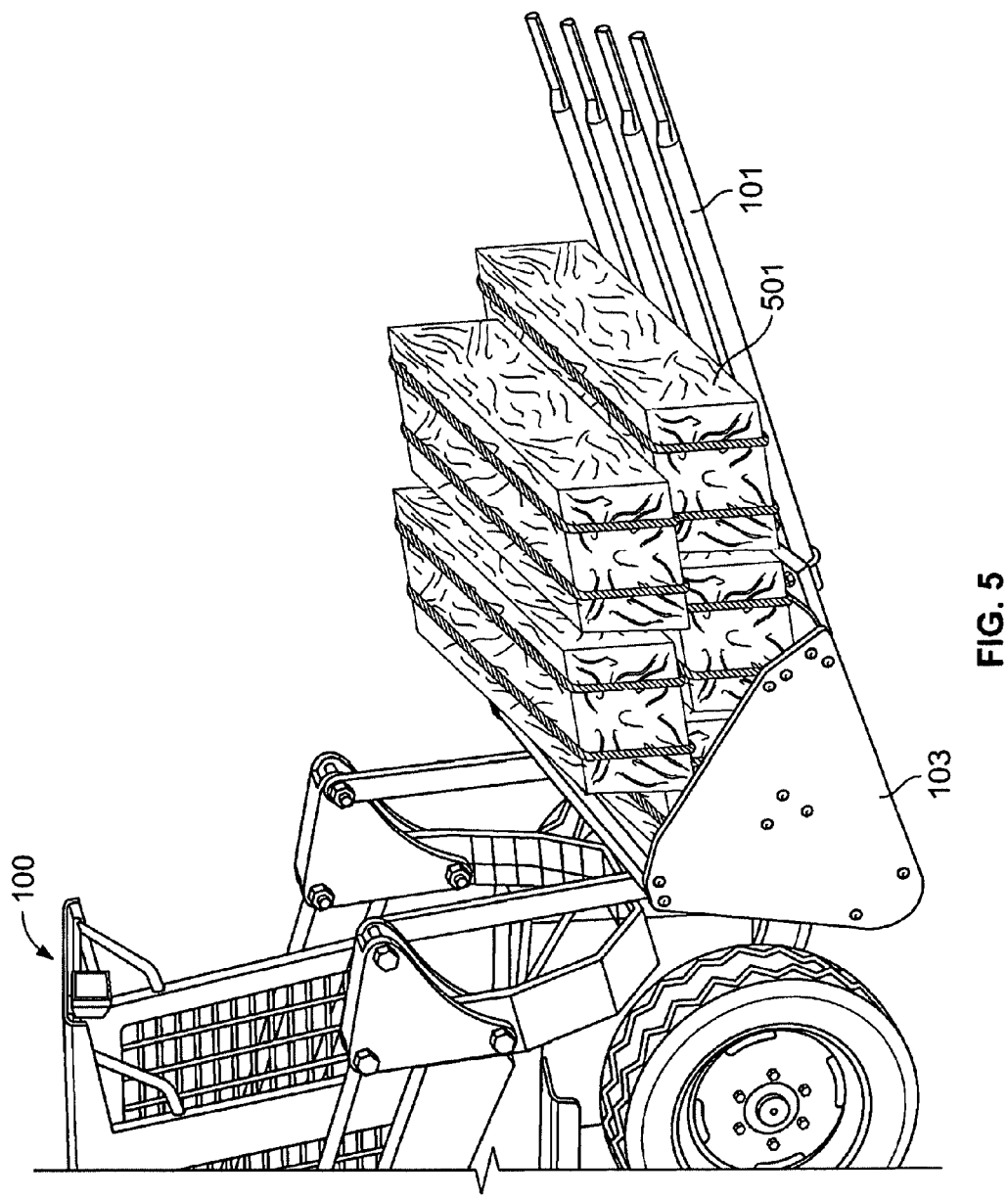
FIG. 5 is a perspective view of a skid steer vehicle having an implement carrying a load of bales according to an embodiment of the present invention.

FIG. 1 shows a perspective elevation view of a skid steer vehicle 100 having a bale tote implement 101 according to an embodiment of the present disclosure. The skid steer vehicle 100 is preferably a small work vehicle, such as a skid loader or skid steer vehicle having a bucket 103 suitable for attachment to the implement. The bucket 103 is not limited to the arrangement shown in FIG. 1 and may include other devices known for use with the skid loaders and/or skid steers. The bale tote implement 101 includes a support body 105 from which a plurality of gathering teeth 107 extend. The gathering teeth 107 include a substantially hollow structure that is flattened at a tip 108. The flattened tip 108 is arranged to provide a substantially flat surface onto which bales may be loaded. The teeth 107 are attached to the support body 105 by slot-forming members 201 and U-shaped fastener 203 (see FIG. 2) configured to receive an end of the tooth 107. The slot-forming members 201, which are arranged along the support body 105, define a plurality of slots, each of which is configured to receive an end of the tooth 107 (see FIG. 2). The support body 105 is fastened to the bucket 103 by a bucket fastener 109. The support body 105 may be fabricated from any suitable material. Suitable materials include, but are not limited to steel, aluminum, or alloys. While the bale tote implement 101 preferably includes only a single bucket fastener 109, a plurality of bucket fasteners 109 may be used. Further, retention plates 111 are affixed to the support body 105 and are configured to hook or otherwise engage one or more surfaces of bucket 103 and support and retain bale tote implement 101 in position. The retention plates 111 may be plates, hooks, features, or any other protrusion capable of engaging and retaining the implement 101 in position adjacent to bucket 103. When bucket fastener 109 is positioned and engaged with the bucket 103, the implement is supported by the bucket fastener 109 and retention plates 111. The size and geometry of the implement 101 is not limited to the configuration shown in FIG. 1. For example, the implement 101 may include any desired space of teeth 107 for loading of various sized bales 501 (see e.g., FIG. 5). Further, the implement 101 may be smaller or larger than the configuration shown in FIG. 1. The implement 101 is preferably configured to lift and load square bales 501 (see e.g., FIG. 5), including bales of hay or straw. "Square bales", as utilized herein, include bales that are configured into a rectangular elongated cube-like geometry. The teeth 107 are preferably spaced and configured to lift and/or load small square bales.

Figure 2:
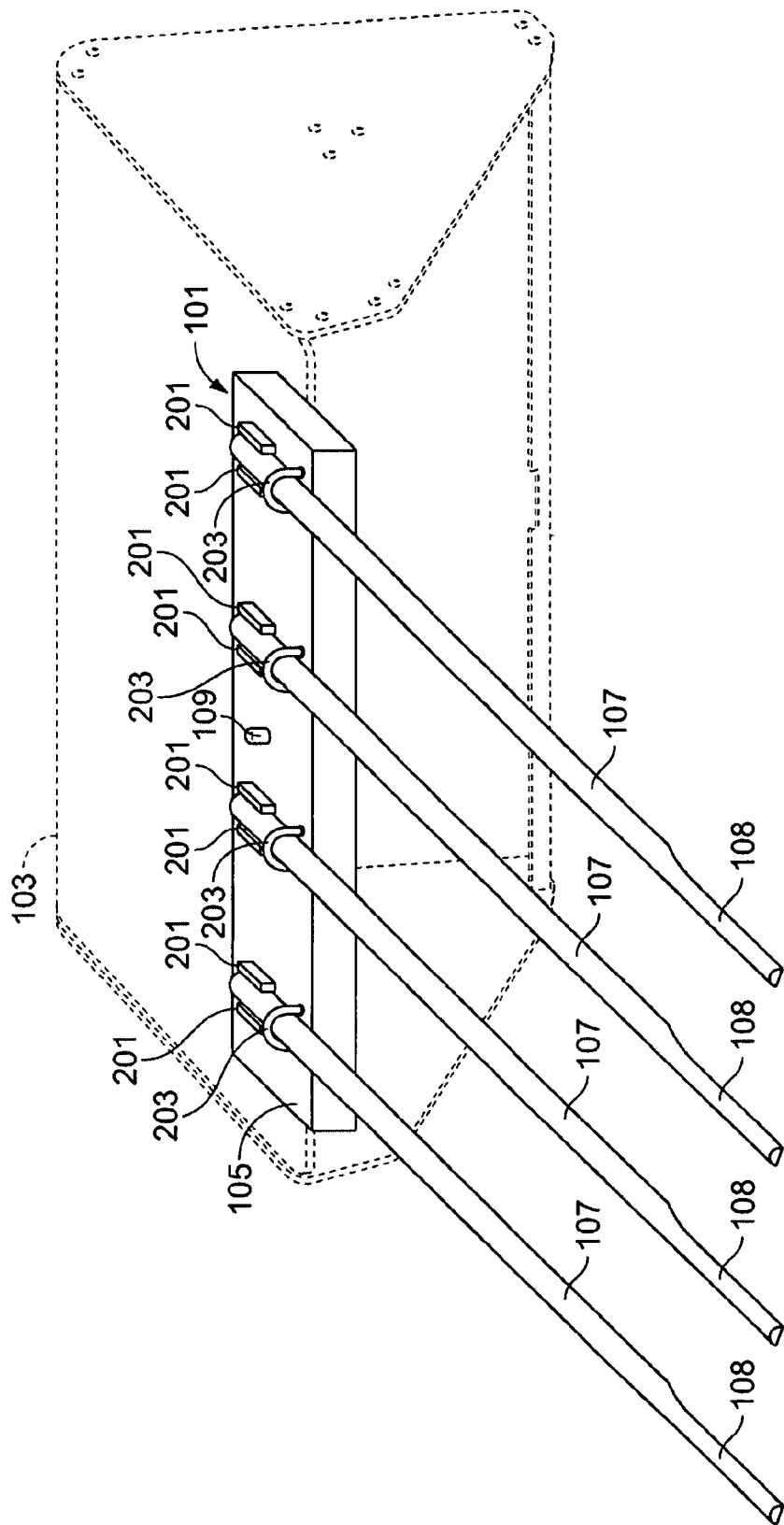
FIG. 2 is a bottom view of an implement according to an embodiment of the present invention.

FIG. 2 shows a bottom view of the bale tote implement 101 according to an embodiment of the present invention. The bale tote implement 101 is engaged with bucket 103 of a skid steer vehicle 100 (not shown in FIG. 2). In addition to the features visible in FIG. 1, the implement 101 includes slots-forming members 201 arranged along the support body 105. The slots-forming members 201 are not limited to the structures shown and may include any suitable slot structure. Suitable structures include, but are not limited to, plates, or bars or any other protrusion configurable into a slot to receive an end of a tooth 107. The teeth 107 are retained in position by U-shaped fasteners 203. The U-shaped fasteners 203 are fastened to the support body 105 by openings that pass through the support body 105. In addition, the teeth 107 include a support dowel 301 (not shown in FIG. 2) that are inserted into the substantially hollow tooth 107 and support the inner diameter of the tooth 107 reacting to the retention force applied by the U-shaped fastener.

Figure 3:
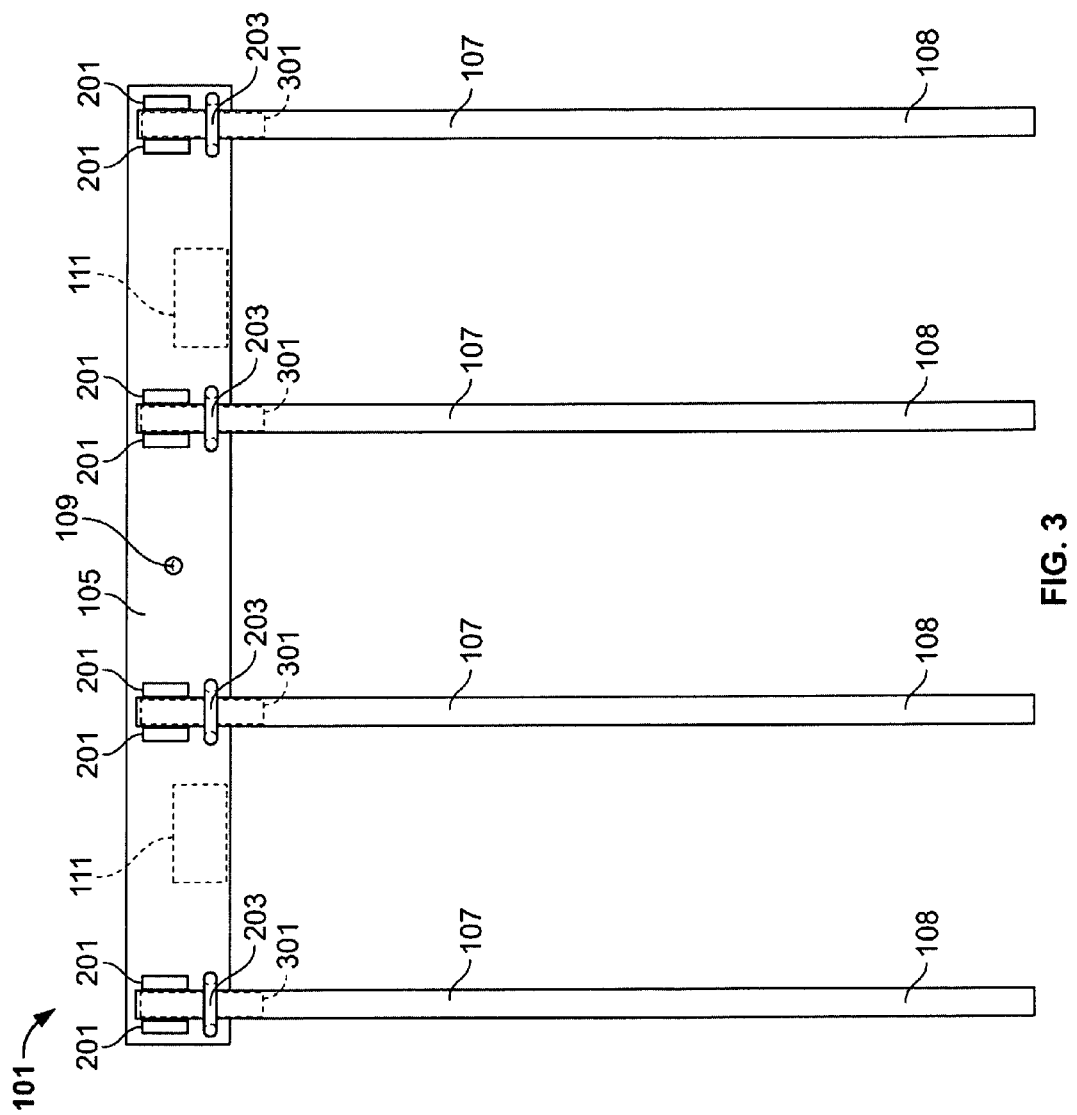
FIG. 3 is a bottom plan view of an implement according to an embodiment of the present invention.

FIG. 3 shows a bottom view of a bale tote implement 101 according to an embodiment of the present disclosure. As discussed above with respect to FIGS. 1 and 2, the implement 101 includes a support body 105 fastenable to a bucket 103 of a skid steer vehicle 100 by bucket fastener 109. The implement 101 further includes a plurality of teeth 107 engaged to the support body 105 by slot-forming members 201 and U-shaped fastener 203. Support plates 111 are arranged on an opposite surface and are configured to engage bucket 103. A support dowel 301 is arranged in each of teeth 107 to support the substantially hollow structure adjacent or substantially adjacent to the U-shaped fastener 203. The support dowel 301 may be fabricated from any suitable material capable of providing support for the substantially hollow tooth 107. Suitable materials for support dowel 301 include, but are not limited to wood, metal, ceramic, polymer or other substantially rigid material.

Figure 4A:
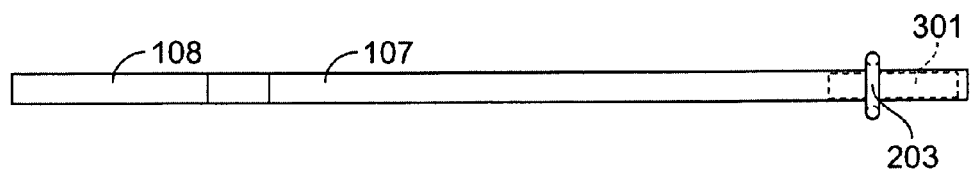
FIG. 4A is a bottom view of a tooth according to an embodiment of the present invention.
Figure 4B:
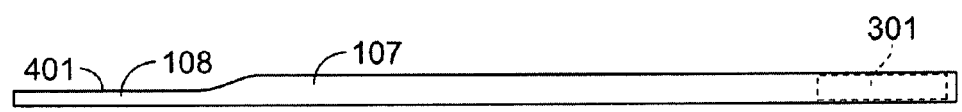
FIG. 4B is a side view of a tooth according to an embodiment of the present invention.
Figure 4C:
FIG. 4C is a top view of a tooth according to an embodiment of the present invention.

FIGS. 4A-4C show various views of a tooth 107 according to an embodiment of the present invention. Teeth 107 are preferably fabricated from a metallic material, such as, but not limited to tubular steel or aluminum. Teeth 107 are fabricated with a substantially hollow structure. A "substantially hollow structure", as utilized herein, includes a structure that is hollow (i.e., contains an open space along the cross-section) for at least a portion along the length. As shown in FIGS. 4A and 4C, the support dowel 301 is inserted into the tooth 107 at the end opposite the tip 108. In addition, the tooth 107 is retained by a U-shaped fastener 203 (see e.g., FIG. 4A) adjacent to or substantially adjacent to the end of tooth 107 having support dowel 301 inserted therein. As shown in FIG. 4B, the flattened tip 108 is preferably flattened to include a lifting surface 401 suitable for lifting and support bales 501 (see e.g., FIG. 5).

The bale tote implement requires manipulation by the operator to provide the advantages provided by the bale tote implement 101. While transporting the implement 101, empty, the teeth 107 are slightly elevated from horizontal maintaining a distance between the tips 108 of teeth 107 above the terrain to avoid any obstacles. The bale tote implement 101 may be manipulated to tilt bales 501 (see e.g., FIG. 5) onto one of the edges. Certain baling equipment may eliminate the need for a tilting step, but the alignment of the bales provides the positioning of the bale strings and the bale makeup, such that lifting of the bales 501 does not damage or distort the bales 501 prior to positioning of the wagon or other structure. Bales 501 may be approached from the lower side, if on an incline. In order to load the bale 501, the bucket 103 is slightly raised and the tips 108 of teeth 107 are lowered to get under the bale 501. The teeth 107 are raised while the operator directs the skid steer vehicle 100 slowly forward. Upon loading of the bale 501, the teeth 107 are lifted such that the bale 501 is tossed back or otherwise urged into the bucket, making room for additional bales 501. The process may be repeated for multiple bales 501 (see e.g., FIG. 5). In certain terrain, particularly hilly operations, at least four (4) bales may be loaded with the implement 101 without manual labor assistance. Unloading to a wagon bed, truck or other structure is preferably performed downgrade or level from the skid steer vehicle 100.

The implement 101 of the present invention includes a structure that is easily repaired. For example, teeth 107, which are subject to damage, may be easily repaired or replaced. In addition, the implement 101 may be repaired in the field without the need for specialized or complicated tools. Teeth 107 may be repaired by simple straightening if bent. In addition, the teeth 107 may be removed and replaced in the field by loosing of the U-shaped fasteners 203 and removal and replacement of the teeth 107.

Further still, in one embodiment of the present disclosure the implement is sufficiently detachable and lightweight to permit shipping by normal couriers or mail systems. As such, for example, the implement may be shipped to distributors via routine mail or courier routes for assembly prior to distribution.

EXAMPLE

An example of a bale tote implement was fabricated using steel. The implement includes a steel bar having the following dimensions 50"×4"×½" with eight ⁵⁄₁₆" holes drilled to receive 4⁵⁄₁₆" U-bolts. In addition, in the center of the steel bar a ½" hole was drilled for mounting to the skid-steer cutting blade bucket. A matching hole was bored in the blade of the skid-steer bucket with a welding torch to match the ½" hole. A ½"×2" steel fastening bolt was passed through the ½" hole and provided attachment of the implement to the bucket. Eight ⅜"×½"×2" steel bar segments were welded to the bottom of the 50" bar to provide stability and strength to the attachment of the four gathering teeth. Two ⅜"×2"×3" steel plates were welded to the top of the 50" steel bar 4" from the outside edge of the bar. These plates frictionally engage the skid-steer cutting blade bucket and support the implement. The four gathering teeth consist of light-weight steel tubing 1.160" inner diameter 42" long that are flattened in a hydraulic press to create an easy entry under the bales as they lay in the field. A 4" support dowel was inserted into the non-flattened end of the tooth. The dowel was fabricated from wood, wherein the diameter was maintained to provide a tight frictional fit within the tooth. U-bolts were tightened over each of the teeth around the end having the support dowel.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A bale tote implement for a skid steer vehicle comprising: an elongated body having a plurality of openings, each opening being configured to receive one or more fasteners, at least one of the openings being configured to receive a fastener to retain the implement in position on a bucket of the skid steer vehicle;
   a plurality of substantially hollow gathering teeth having a first end and a second end, the first end being substantially flattened and the second end having a support dowel inserted therein;
   a plurality of slot-forming members arranged along the elongated body, the slot-forming members defining a plurality of slots arranged along the elongated body, each slot of the plurality of slots being configured to receive the second end of one of the gathering teeth;
   a plurality of U-shaped fasteners positioned adjacent the second end and through at least two of the openings in the elongated body; and
   wherein the U-shaped fasteners apply a retention force on the second end and the support dowel to retain the teeth in position within the slots.

2. The implement of claim 1, wherein the implement is attached to the skid steer vehicle by a single fastener.

3. The implement of claim 1, wherein the implement comprises four teeth.

4. The implement of claim 1, wherein the first end includes a flattened surface for lifting and loading square bales.

5. The implement of claim 1, wherein the support dowel includes a material selected from the group consisting of wood, metal, ceramic, polymer and combinations thereof.

6. The implement of claim 1, wherein the support dowel includes wood.

7. A method for loading bales onto a vehicle comprising: providing a bale tote implement for a skid steer vehicle comprising:
   an elongated body having a plurality of openings, each opening being configured to receive one or more fasteners, at least one of the openings being configured to receive a fastener to retain the implement in position on a bucket of the skid steer vehicle;
   a plurality of substantially hollow gathering teeth having a first end and a second end, the first end being substantially flattened and the second end having a support dowel inserted therein;
   a plurality of slot-forming members arranged along the elongated body, the slot-forming members defining a plurality of slots arranged along the elongated body, each slot of the plurality of slots being configured to receive the second end of one of the gathering teeth;
   a plurality of U-shaped fasteners positioned adjacent the second end and through at least two of the openings in the elongated body; and
   wherein the U-shaped fasteners apply a retention force on the second end and the support dowel to retain the teeth in position within the slots operating the skid steer vehicle into close proximity to a square bale;
   lifting the square bale onto the teeth and directing the teeth in a direction urging the square bale toward the bucket of the skid steer vehicle;
   operating the skid steer vehicle into close proximity to a receiving vehicle, raising the bucket to a height substantially above the vehicle and lowering the teeth to permit the bales to move onto the receiving vehicle.

8. The method of claim 7, wherein the implement is attached to the skid steer vehicle by a single fastener.

9. The method of claim 7, wherein the implement comprises four teeth.

10. The method of claim 7, wherein the first end includes a flattened surface for lifting and loading square bales.

11. The method of claim 7, wherein the support dowel includes a material selected from the group consisting of wood, metal, ceramic, polymer and combinations thereof.

12. The method of claim 7, wherein the support dowel includes wood.

13. The method of claim 7, wherein the operating takes place on hilly terrain.

14. The method of claim 7, wherein the receiving vehicle is a wagon.

15. The method of claim 7, wherein the lifting step is repeated to lift at least four square bales.

16. The method of claim 7, wherein the implement is configured to transport at least ten square bales.

17. A bale tote implement for a skid steer vehicle comprising:
   an elongated body having a plurality of openings, each opening being configured to receive one or more fasteners, at least one of the openings being configured to receive a fastener to retain the implement in position on a bucket of the skid steer vehicle;
   a plurality of substantially hollow gathering teeth having a first end and a second end, the first end being substantially flattened;
   a plurality of slot-forming members arranged along the elongated body, the slot-forming members defining a plurality of slots arranged along the elongated body, each slot of the plurality of slots being configured to receive the second end of one of the gathering teeth;

a plurality of U-shaped fasteners positioned adjacent the second end and through at least two of the openings in the elongated body; and wherein the U-shaped fasteners apply a retention force on the second end and the support dowel to retain the teeth in position within the slots.

18. The implement of claim 17, wherein the elongated body includes an aperture configured to receive therethrough a fastener for attaching the bale tote implement to the skid steer vehicle.

19. The implement of claim 17, wherein the elongated body includes a retention plate arranged and disposed to aid in retaining the bale tote implement in position upon attachment of the bale tote implement to a bucket of the skid steer vehicle.

20. The implement of claim 19, wherein the retention plate member and the plurality of slot-forming members are on opposing surfaces of the elongate body.

* * * * *